May 12, 1925.  1,537,152

H. W. SPUNG

DIRECTION INDICATOR

Filed Aug. 11, 1924   2 Sheets-Sheet 1

H. W. Spung, Inventor

By C. A. Snow & Co

Attorneys

May 12, 1925.
H. W. SPUNG
DIRECTION INDICATOR
Filed Aug. 11, 1924
1,537,152
2 Sheets-Sheet 2
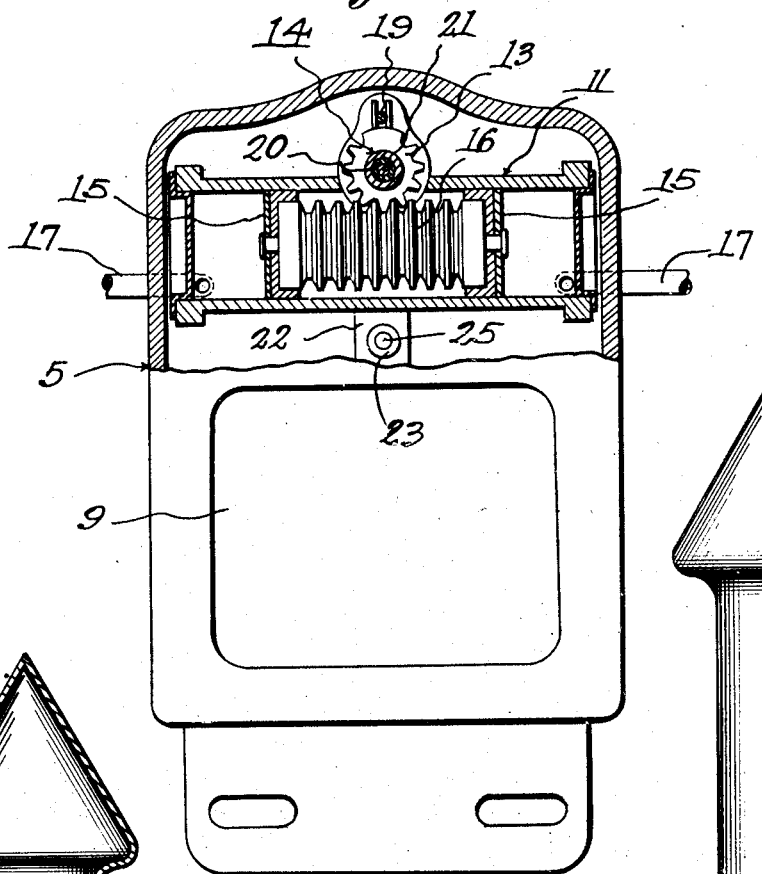
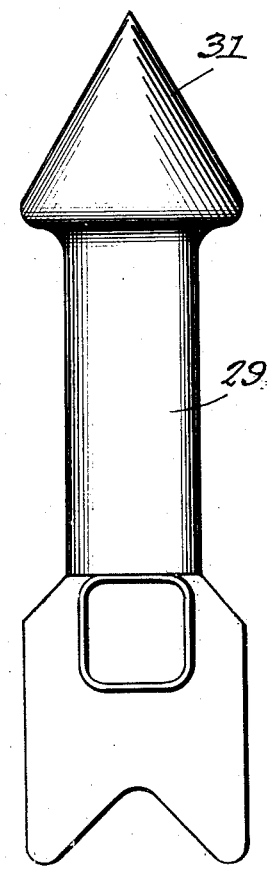
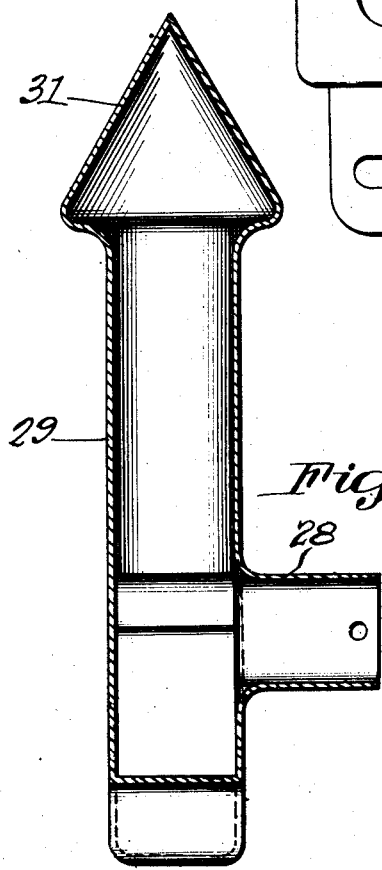
H. W. Spung, Inventor
By C. A. Snow & Co.
Attorneys Patented May 12, 1925.

1,537,152

UNITED STATES PATENT OFFICE.

HOWARD W. SPUNG, OF MARIETTA, OHIO.

DIRECTION INDICATOR.

Application filed August 11, 1924. Serial No. 731,414.

*To all whom it may concern:*

Be it known that I, HOWARD W. SPUNG, a citizen of the United States, residing at Marietta, in the county of Washington and State of Ohio, have invented a new and useful Direction Indicator, of which the following is a specification.

This invention relates to a direction indicator especially designed for use on motor vehicles and aims to improve generally the construction as shown in my Patent Number 1,465,494 dated August 21, 1923.

An important feature of the invention is to provide a translucent indicating member whereby the outline of the indicating member will be clearly defined in the dark as well as in the light.

Another important object of the invention is to provide a body portion of a novel arrangement whereby the lower portion thereof acts as a reflector to direct light rays from a rear lamp, onto the license plate supported directly below the body portion.

Another object of the invention is to improve the operating means to insure a positive operation of the indicator when a vacuum is created at one side of the piston, to be hereinafter more fully described.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 3 is a sectional view through the upper portion of the body portion taken at right angles to Figure 1.

Figure 4 is a sectional view through the indicating member.

Figure 5 is a rear elevational view of the translucent indicating member.

Figure 2:
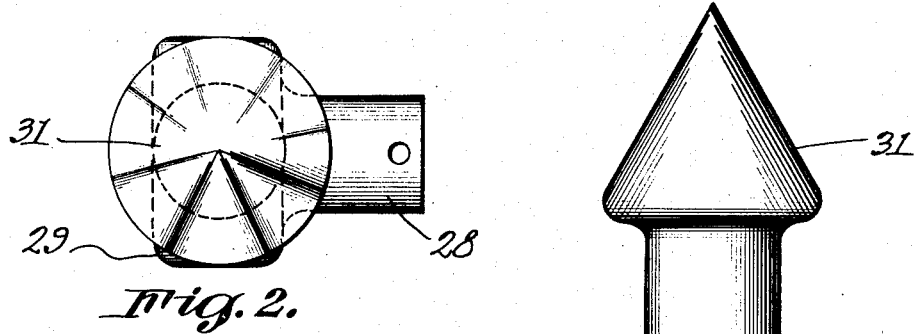
Figure 2 is a plan view of the indicating member.

Referring to the drawings in detail, the body portion or casing of the indicator is indicated generally by the reference character 5 and as shown is provided with an upwardly curved lower wall 6 providing a clearance for the electric bulb 7 mounted in the socket 8 and supplied with electric energy through suitable wires not shown. Thus it will be seen that the curved wall 6 not only guards the lamp 7 against breakage by objects hitting the lamp, but at the same time provides a reflecting surface to direct the light rays downwardly onto a license plate which is supported below the casing 5.

The casing 5 is provided with an opening 9, which is normally closed by the lens 9' that may be provided with certain letters indicating stop so that when the light rays from the bulb 10 are projected through the lens 9', a stop signal will be provided.

Secured within the casing and disposed at the upper portion thereof, is a cylinder indicated at 11, brackets 12 being provided and affording means to permit of such securing of the cylinder. The upper wall of the cylinder is open to accommodate the gear 13 secured to the shaft 14 that has its outer end extended through the front wall of the casing 5 to permit the indicating member, to be hereinafter more fully described, to be secured thereto.

Operating in the cylinder 11 are pistons 15 which are held in spaced relation by means of the elongated ribbed member 16, the ribs cooperating with the teeth of the gear 13 in a manner to cause the gear to rotate and transmit motion to the shaft 14 when the pistons are reciprocated in the cylinder 11

Pipes 17 have communication with the interior of the cylinder 11 at points adjacent to the ends thereof so that air may be drawn from the cylinder between the ends of the cylinder and pistons, thereby creating a vacuum within the cylinder at a predetermined end, moving the pistons longitudinally of the cylinder to rotate the gear 13 and shaft 14 in a manner as described. It is to be understood that these pipes 17 are connected to a suitable suction creating device and may be tapped into the intake manifold of the engine of the motor vehicle, suitable valves being provided to establish communication between the intake manifold and cylinder when it is desired to move the pistons in the cylinder.

Mounted on the shaft 14 is a coiled spring 18 which has one end thereof engaging the pin 19 so that when the suction in the cylinder has been relieved the coiled spring will act to return the pistons and member 16 to their normal or inactive positions.

Figure 1:
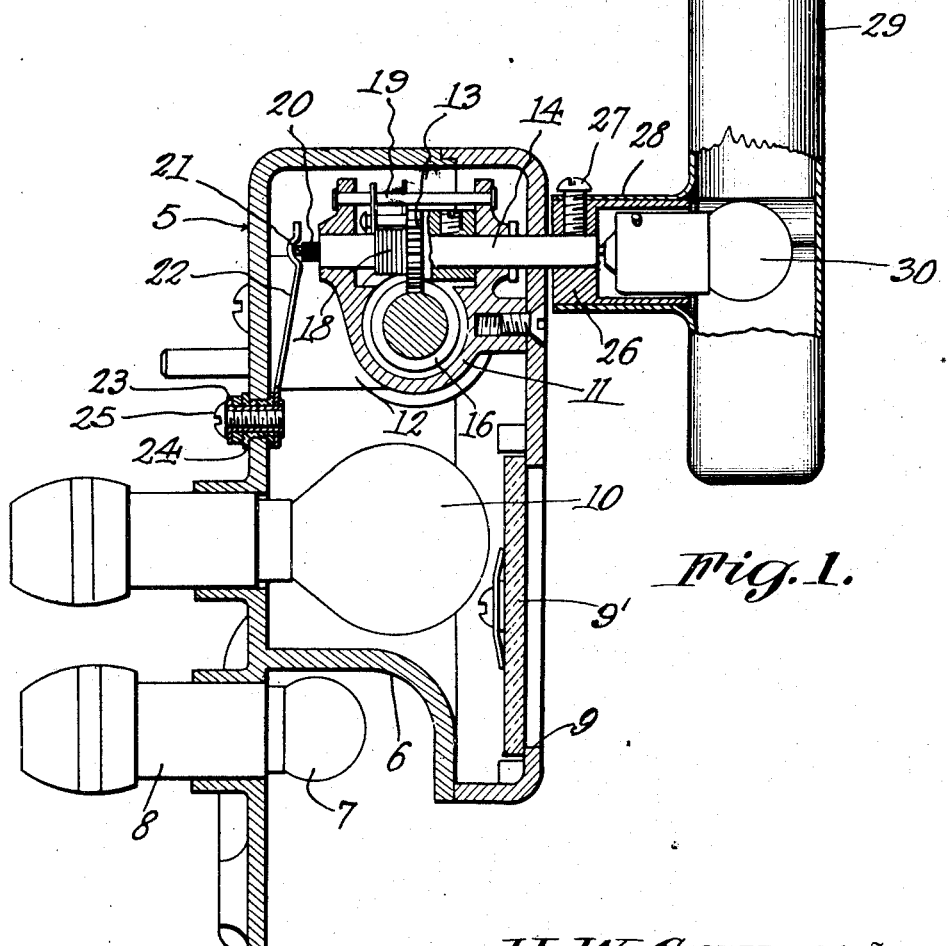
Figure 1 is a sectional view through an indicator constructed in accordance with the invention.

As clearly illustrated by Figure 1 of the drawings, the shaft 14 is hollow and supports the tubular insulating member 20 in which the wire 21 is positioned, which wire has contact with the spring arms 22 secured within the housing by means of the securing member 23 which is insulated from the housing by means of the fibrous sleeve 24. The electric wire supplying electric current to the member 21 has connection with the screw 25.

Mounted on the outer end of the shaft 14 is a lamp socket indicated at 26 which is formed with an opening to accommodate the set screw 27 which moves through a suitable opening in the tubular extension 28 of the indicating member 29 so that the set screw 27 may be removed and the indicating member disconnected from the lamp socket 26 should it be desired to replace the bulb which is indicated at 30.

The indicating member is of a novel construction and as shown is tubular in formation, the upper end thereof being formed into a head 31 tapered to indicate direction. This indicating member is formed of translucent material such as celluloid or the like, which is red in color to act as a tail light and to cause the indicator to be plainly visible in the dark.

From the foregoing it will be obvious, that due to this construction, that when a suction is created at either end of the member 16, the member 16 will be drawn longitudinally of the cylinder to move the shaft and indicator mounted thereon, indicating direction.

It might be further stated that suitable mechanism may be provided for lighting the various lamps of the device so that the lamps may be lighted automatically or by manually controlled switches at the will of the operator.

I claim:—

1. In a direction indicator, a casing, said casing having its lower wall curved upwardly and inwardly to provide a compartment, a lamp supported within the compartment, and an indicating member supported by the casing and adapted to be moved to indicate direction.

2. In a direction indicator, a casing, said casing having its lower wall curved to provide a reflecting surface, a lamp supported under the reflecting surface, and a movable indicating hand supported by the casing and adapted to indicate direction.

3. In a direction indicator, a casing, a cylinder mounted in the upper portion of the casing, pistons in the cylinder, an elongated ribbed member in the cylinder and having connection with the pistons, said pistons and elongated member adapted to be moved longitudinally of the cylinder by suction, a shaft extending through a wall of the casing and having a gear cooperating with the ribs to receive motion from the elongated member, a hollow indicating member mounted on the shaft and said hollow indicating member adapted to be moved to indicate direction.

In testimony that I claim the foregoing as my own, I have hereto affixed my signature in the presence of two witnesses.

HOWARD W. SPUNG.

Witnesses:
C. C. MIDDLESWART,
DORA FRUMERMAN.